(12) United States Patent
Deeg et al.

(10) Patent No.: US 12,220,655 B2
(45) Date of Patent: Feb. 11, 2025

(54) METHOD FOR JOINING A FILTER AND A COMPONENT, AND FILTER-COMPONENT SYSTEM

(71) Applicant: Knorr-Bremse Systeme Fuer Nutzfahrzeuge GmbH, Munich (DE)

(72) Inventors: Markus Deeg, Eberdingen (DE); Simon Grass, Erkenbrechtsweiler (DE); Julian Soehnlein, Schwieberdingen (DE); Andreas Eisenberger, Nuertingen (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 681 days.

(21) Appl. No.: 17/309,970

(22) PCT Filed: Jan. 7, 2020

(86) PCT No.: PCT/EP2020/050201
§ 371 (c)(1),
(2) Date: Jul. 6, 2021

(87) PCT Pub. No.: WO2020/144176
PCT Pub. Date: Jul. 16, 2020

(65) Prior Publication Data
US 2022/0096969 A1   Mar. 31, 2022

(30) Foreign Application Priority Data
Jan. 9, 2019  (DE) ............... 10 2019 200 188.2

(51) Int. Cl.
*B01D 29/01*   (2006.01)
*B01D 35/02*   (2006.01)
(Continued)

(52) U.S. Cl.
CPC .......... *B01D 29/012* (2013.01); *B01D 35/02* (2013.01); *B01D 35/157* (2013.01);
(Continued)

(58) Field of Classification Search
CPC .. B01D 29/012; B01D 46/0001; B01D 46/10; B01D 2265/04; B01D 2201/16;
(Continued)

(56) References Cited

U.S. PATENT DOCUMENTS 4,260,198 A * 4/1981 Cook ................ B60T 13/12
303/117.1
4,929,176 A    5/1990 Nitta
(Continued)

FOREIGN PATENT DOCUMENTS

CN           1341035 A       3/2002
CN         103370134 A      10/2013
(Continued)

OTHER PUBLICATIONS

English Translation of JP2004-508908A, published Mar. 2004. (Year: 2004).*
(Continued)

*Primary Examiner* — Joseph W Drodge
(74) *Attorney, Agent, or Firm* — NORTON ROSE FULBRIGHT US LLP; Gerard A. Messina

(57) ABSTRACT

A method for connecting a filter material to a fluidic component, the method including: connecting the filter material to the fluidic component by a material bonding process. A system, including: a fluidic component; and a filter material that can be connected to the fluidic component; in which the filter material is configured to be connected to the fluidic component by a material bond.

16 Claims, 2 Drawing Sheets

(51) Int. Cl.
*B01D 35/15* (2006.01)
*B01D 35/157* (2006.01)
*B01D 46/00* (2022.01)
*B01D 46/10* (2006.01)

(52) U.S. Cl.
CPC ......... *B01D 46/0001* (2013.01); *B01D 46/10* (2013.01); *B01D 2265/04* (2013.01)

(58) Field of Classification Search
CPC .............. B01D 2201/167; B01D 35/02; B01D 35/157; B01D 35/1573; B01D 2201/165; B01D 29/01; B01D 29/03; B01D 29/05; B01D 29/44; B01D 29/48; A62B 7/10; A62B 9/02; A62B 23/00; A62B 23/02; B60G 2202/152; B60G 2202/154; B60T 8/341; B60T 8/342; B60T 8/327; F16D 2125/02; F16D 2125/026
USPC ........................................................ 239/575
See application file for complete search history.

(56) References Cited

U.S. PATENT DOCUMENTS

| | | | |
|---|---|---|---|
| 5,238,205 A * | 8/1993 | Gleichauf | F02B 75/34 244/54 |
| 5,512,172 A | 4/1996 | Marble | |
| 5,885,409 A * | 3/1999 | Gil | B29C 66/8242 156/580.2 |
| 5,925,205 A * | 7/1999 | Zimmermann | F02M 61/1806 156/150 |
| 6,187,182 B1 | 2/2001 | Reynolds et al. | |
| 6,364,978 B1 | 4/2002 | Skov et al. | |
| 6,451,205 B1 * | 9/2002 | McGaw, Jr. | B29C 66/1122 210/489 |
| 6,796,339 B1 * | 9/2004 | Petty | B60T 17/222 141/69 |
| 6,949,155 B1 * | 9/2005 | Lang | B29C 66/81433 156/203 |
| 2003/0047993 A1 * | 3/2003 | Furuya | B60T 8/4031 303/116.4 |
| 2018/0161796 A1 | 6/2018 | Strange et al. | |
| 2018/0214806 A1 * | 8/2018 | Tate | B01D 46/522 |

FOREIGN PATENT DOCUMENTS

| | | | | |
|---|---|---|---|---|
| CN | 104870058 A | * | 8/2015 | ......... A41D 13/1115 |
| DE | 102012206941 A1 | * | 10/2013 | ............ B60T 8/341 |
| DE | 102015218183 A1 | | 3/2017 | |
| JP | 2004508908 A | * | 3/2004 | ............ A62B 18/10 |
| JP | 200587969 A | | 4/2005 | |
| JP | 2007503985 A | * | 3/2007 | ............ B01D 35/04 |
| JP | 201484806 A | | 5/2014 | |

OTHER PUBLICATIONS

English Translation of Duffy Publication CN 104870058, published Aug. 2005. (Year: 2005).*
English Translation of JP2007-503985A, published Mar. 2007. (Year: 2007).*
English Translation of Kratzer Publication DE 102012206941, published Oct. 2013. (Year: 2013).*
International Search Report for PCT/EP2020/050201 Issued Mar. 30, 2020.

* cited by examiner

METHOD FOR JOINING A FILTER AND A COMPONENT, AND FILTER-COMPONENT SYSTEM

FIELD OF THE INVENTION

The invention relates to a method for connecting a filter material to a fluidic component, in particular to a method and a fluidic component which are used in the field of vehicles.

BACKGROUND INFORMATION

It is the case in particular in vehicles with pneumatic systems for braking or suspension systems that filters are used in the pneumatic systems to avoid contamination of sensors, solenoid valves, pistons, sealing collars, membranes, etc. A filter, which is the first filter in the flow direction of the air, in the pneumatic systems is usually a main air filter, for example an intake air filter or an air filter in a four-circuit protection valve. In order to collect contaminants which are produced downstream of the main filter, filters which sit directly on a respective module or the solenoid valve are then often used. This also stops contamination particles which are produced during the assembly or flakes, chips and burrs which are produced inside pneumatic lines. These filters are also required in order to stop what are known as "in-built" particles.

Such filters are clipped or screwed into the components, for example the modules or the solenoid valves, or injection molded into plastics components, which are then used as filters. The filters thus have to be assembled as an additional part or, when they are injection molded, must be placed as an insert part into a plastics injection-molding tool, both of these being cost-intensive. The filtering thus fundamentally gives rise to extra costs. When, furthermore, individual parts that are required with filtering and without filtering are used, it is necessary, for example if the filter is injection molded, to allocate two component numbers which are then associated with the corresponding outlay for storage, procurement etc., since there is one component with a filter and one component without a filter.

SUMMARY OF THE INVENTION

The invention is thus based on the object of providing a method and a fluidic component which eliminate the above-mentioned disadvantages, and of providing a method and a fluidic component which provide filtering in a flexible and cost-effective manner.

The object may be achieved by a method as described herein and a system as described herein. Advantageous further developments are included in the further descriptions herein.

According to one aspect of the invention, a method for connecting a filter material to a fluidic component includes the step of connecting the filter material to the fluidic component by a material bonding process.

As a result of the material bonding process, there is the option to provide filtering of a fluid that flows into the fluidic component in a flexible manner as required during the production, no additional components such as clips or screws, for example, being necessary.

In an advantageous configuration of the method, the material bonding process is an ultrasonic welding process.

The use of the ultrasonic welding process means that no additional connecting material, such as an adhesive, for example, is required. Moreover, the fluidic component may be further processed without long waiting times, for example for the adhesive to harden.

In an advantageous configuration of the method, it includes the step of automatically supplying the filter material in a suitable shape and size.

On account of this step, it is possible to provide a suitable filter material quickly without great outlay.

In a further advantageous configuration of the method, the suitable shape and size of the filter material are created by stamping, and the stamping is carried out by a correspondingly equipped welding tool for the ultrasonic welding process.

If the stamping is carried out by the welding tool for the ultrasonic welding process, an additional tool is not required to carry out the stamping, this in turn reducing investment costs.

In a further advantageous configuration of the method, the stamping and a welding operation of the ultrasonic welding process are carried out in a single working stroke of the welding tool.

By carrying out the two work steps of stamping and welding in one working stroke, the processing time is low, this saving assembly time. Moreover, a placement of the filter material for the purpose of connecting is simplified, since transport to the connection location can be performed by the welding tool.

In an advantageous configuration of the method, the connecting of the filter material to a housing part of the fluidic component is a step of an operation of assembling the fluidic component in a superordinate assembly.

In this configuration, it is possible for the fluidic component to be provided with special properties as late as during the operation of assembling in the superordinate assembly, which at an earlier point in time would lead to an increased manufacturing and administrative outlay.

In an advantageous configuration of the method, the filter material is connected to a functional element of the fluidic component, and the connecting is effected as a step of an assembly operation, in particular during a final assembly, in which the functional element is assembled in the fluidic component.

In this configuration, it is possible merely to form that functional element which is used for a special function in the fluidic component and thus is present in any case from a material suitable for the material bond and to provide the advantages of flexibility and saving on additional components for connecting the filter material.

In a further advantageous configuration of the method, depending on the intended use, the fluidic component is equipped with the filter material or is not equipped with the filter material, and the functional element is assembled in the fluidic component with the filter material connected to the functional element depending on the use of the fluidic component.

As a result, the actual use of the fluidic component can be flexibly reacted to, with the result that a functional element correspondingly equipped with the filter material is assembled only as required. This may favorably take place in the course of the final assembly.

In a further advantageous configuration of the method, the fluidic component is a valve, and a use of the valve is the use as an inlet valve or an outlet valve, wherein the functional element is assembled with the filter material connected thereto when the valve is used as an inlet valve.

In this special example, a determination as to whether the valve is used as the inlet valve or the outlet valve may be effected merely by assembling the functional element with a specific distinct form, namely whether the filter material is present thereon or not.

In a further advantageous configuration of the method, the functional element is a nozzle.

The nozzle as the functional element makes it possible for the fluid to be filtered as a result of a position of the nozzle when the fluid enters the valve.

According to a further aspect of the invention, a system composed of a fluidic component and a filter material connected thereto is provided, wherein the filter material is configured to be connected to the fluidic component by a material bond.

As a result of the system composed of the fluidic component and the filter material connected thereto by the material bond, there is the option to provide the filtering of the fluid that flows into the fluidic component in a flexible manner as required, no additional components such as clips or screws, for example, being necessary.

According to an advantageous configuration of the system, the fluidic component is a valve.

In this configuration, the valve may be provided in a flexible manner, with the result that it is not necessary to provide a plurality of valves of different types with the corresponding outlay in terms of provision.

According to a further advantageous configuration of the system, the filter material is configured to be connected to a functional element of the fluidic component, which is configured to be assembled depending on the use of the fluidic component.

In this respect, a valve which can fundamentally be used for a plurality of usage situations can be formed merely by providing the functional element with the filter material attached thereto for a specific use, namely as the inlet valve.

In a further advantageous configuration of the system, the functional element is a nozzle.

Since the nozzle is used with or without the filter material in different embodiments, namely depending on the use of the fluidic component, namely to be used as the inlet valve or the outlet valve, the nozzle is particularly suitable as the functional element to provide the filter material in a flexible manner.

According to a further advantageous configuration of the system, the nozzle is an incoming-air nozzle introduced in an inlet opening in the fluidic component.

When the filter material is being connected to the incoming-air nozzle, the fluid flowing into the fluidic component can be filtered in an easily provided manner.

The invention will now be explained on the basis of exemplary embodiments with reference to appended drawings.

DETAILED DESCRIPTION

Figure 1:
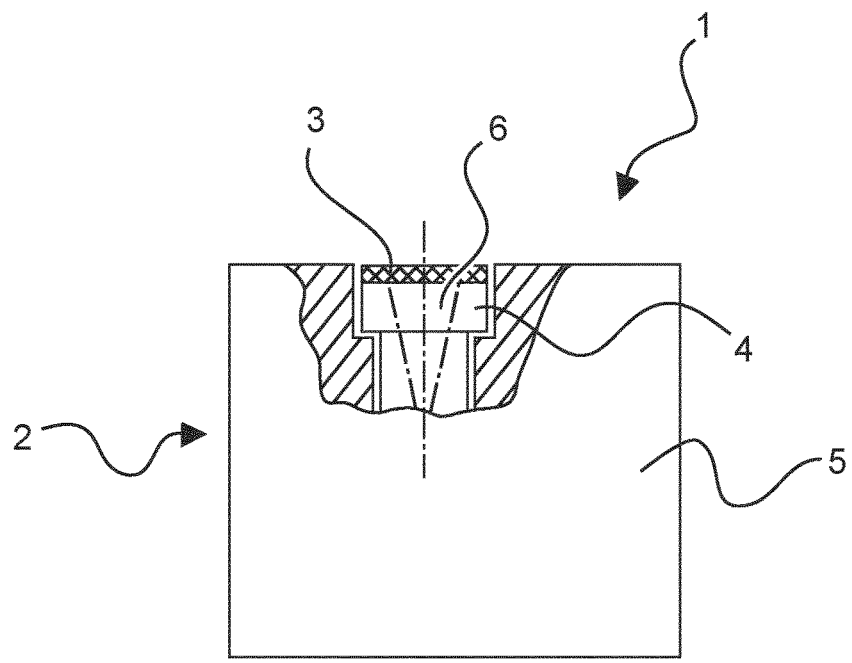
FIG. 1 shows a partially sectional, basic illustration of a system according to the invention that has a fluidic component and a filter material.

FIG. 1 shows a partially sectional, basic illustration of a system 1 according to the invention that is composed of a valve 2 as a fluidic component and a filter material 3, which is connected to the fluidic component.

The system 1 also has a nozzle 4 as a functional element of the system 1. The functional element is used for a special function in the fluidic component. The valve 2 also has a housing body 5 as one of a number of housing parts which receive functional elements of the valve 2.

The filter material 3 has a mesh width suitable for filtering out particles which disrupt a function of the fluidic component. The filter material 3 is connected to the nozzle 4 by a material bond. This connection of two components thus differs from an integral production of the nozzle 4 with the filter material 3. In this embodiment, the material bond is a connection by an ultrasonic welding process. The nozzle 4 is an incoming-air nozzle of the valve 2 that is provided with the filter material 3 in order to filter supplied compressed air which flows into the valve 2 through an opening 6 in the nozzle 4. In this embodiment, the valve 2 is used as an inlet valve.

In an alternative embodiment, the material bond is effected by another connection principle, for example adhesive bonding or soldering. In further alternative embodiments, the filter material 3 is not connected to the nozzle 4 but to the fluidic component itself, for example to one of the housing parts of the valve 2, or to another functional element. In addition, as an alternative the fluid is not compressed air but rather another gas or a liquid, for example.

Figure 2:
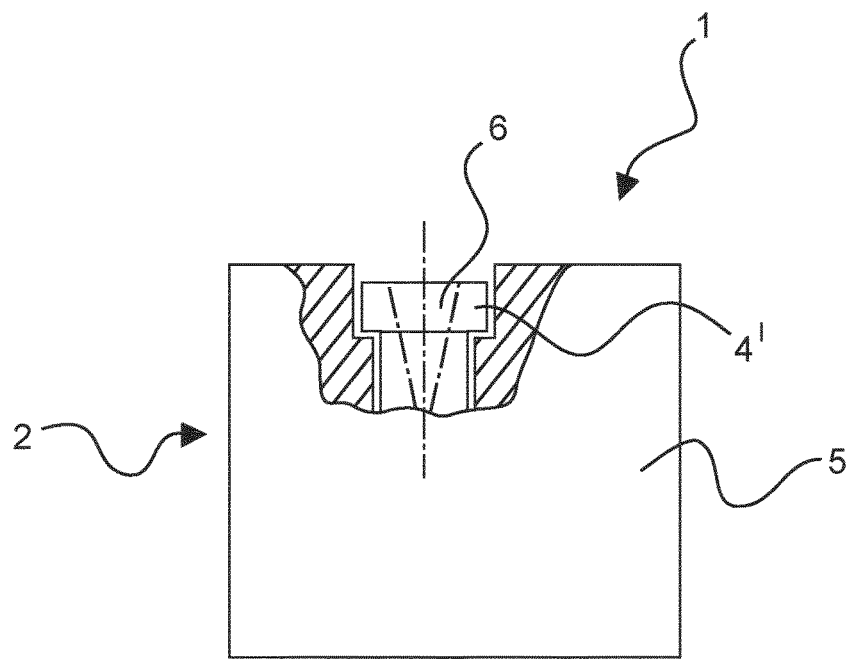
FIG. 2 shows a partially sectional, basic illustration of the fluidic component.

FIG. 2 shows a partially sectional, basic illustration of the valve 2 as the fluidic component.

In the fluidic component shown in FIG. 2, a nozzle 4' is not provided with a filter material, but rather merely has the opening 6 through which compressed air can flow. The nozzle 4' is assembled at the same inlet to the valve 2 as the nozzle 4. The valve 2 shown in FIG. 2 is used as an outlet valve, the filter material not being used in order not to impede the fluid from flowing away and in order to allow foreign bodies possibly still present in the fluid in the valve 2 to flow out unhindered. The valve 2 shown in FIG. 2 is thus not an embodiment of the invention, but serves merely to explain the options of the claimed method and the claimed system.

The nozzle 4 shown in FIG. 1 and the nozzle 4' shown in FIG. 2 are thus assembled depending on the use of the fluidic component.

Figure 3:
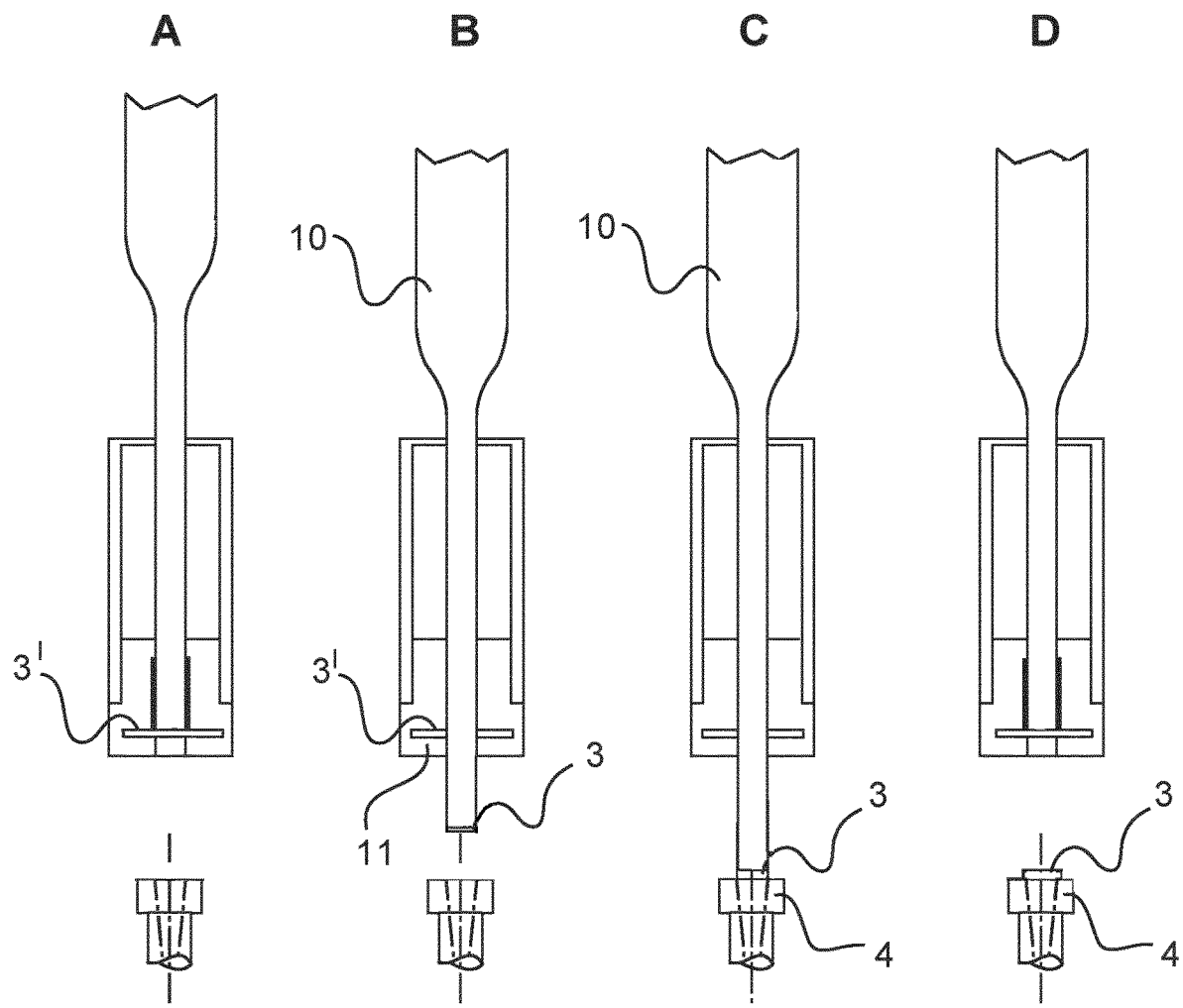
FIG. 3 shows a basic illustration of steps of a material bonding process.

FIG. 3 shows a basic illustration of steps of a cycle of a material bonding process by which the filter material 3 is connected to the fluidic component. FIG. 3 includes four illustrations 3A, 3B, 3C and 3D, which illustrate individual steps of the process.

In the embodiment shown in FIG. 3, the connecting method is the ultrasonic welding process, to connect the filter material 3 shown in FIG. 1 to the nozzle 4, but may as explained above alternatively also be another material bonding process.

As illustrated in FIG. 3A, the filter material 3 is provided as a strip 3', which is automatically supplied. For this purpose, the strip 3' is wound up on a coil and, as required, a necessary length corresponding to a necessary length is supplied. As an alternative, the filter material 3 is not provided as a strip 3' but rather in the form of a plate, for example, which in that case is supplied by hand, or the strip 3' is provided in a different form than that on the coil.

FIG. 3B shows a state in a step immediately after the filter material 3 has been stamped out of the strip 3' by a sonotrode as the welding tool 10. During the stamping out operation, a suitable shape and size of the filter material 3 is created.

For this purpose, an ultrasonic welding device has a die 11 in a suitable shape and the welding tool 10 as a stamping punch in a complementary shape.

In an alternative embodiment, the filter material 3 is provided in the suitable shape and size not by stamping, but rather is supplied already prepared in the suitable shape and size.

FIG. 3C shows a step of an actual connecting operation. In the ultrasonic welding process, the sonotrode is used as the welding tool 10, into which a high-frequency vibration, namely an ultrasonic vibration, is introduced that in turn is transferred to the filter material 3 and the nozzle 4. For this purpose, in addition to the ultrasonic vibration, a compressive force is applied to the sonotrode. The transferred ultrasonic vibration plasticizes and then welds together, and thus connects, the filter material 3 and a material of the nozzle 4.

FIG. 3D shows the state after connecting the filter material 3 to the nozzle 4.

During use, the filter material 3 is automatically supplied by the strip 3', with the result that the filter material 3 can be stamped out in the required shape and size. After this, the welding tool 10 moves, downward in the illustrated embodiment, in order to stamp the filter material 3 out of the strip 3'. The stamping tool 10 moves further in the direction of the nozzle 4 and, when the stamping tool 10 impacts the stamped-out filter material 3, the ultrasonic vibration is transferred from the stamping tool 10 via the filter material 3 to the nozzle 4, as a result of which the filter material 3 and a material of the nozzle 4 are plasticized. As shown in particular in illustrations 3B and 3C, the stamping and the welding are carried out in a single working stroke. As an alternative, these two operations can also be carried out in a plurality of working strokes. After the materials have cooled, a material bond is produced.

The filter material 3 is connected to the nozzle 4 as a step of an assembly operation, in which the functional element is assembled in the fluidic component, that is to say the nozzle 4 is assembled in the valve 2.

In the further course of the assembly operation, the nozzle 4 with the filter material 3 connected thereto is assembled in the valve 2. This is effected when the valve 2 is used as the inlet valve.

In the case in which the valve 2 is used as the outlet valve, the nozzle 4' is assembled without the filter material 3. The nozzle 4, 4' is thus assembled in the fluidic component depending on the use of the fluidic component.

In an alternative configuration, in which it is not the nozzle 4 but rather a housing part of the valve 2, for example the housing body 5, that is connected to the filter material 3, the connection is effected as a step in an assembly operation in which the fluidic component is assembled in a superordinate assembly.

All the features presented in the description, the subsequent claims and the drawing may be essential to the invention both individually and in any desired combination.

THE LIST OF REFERENCE SIGNS IS AS FOLLOWS

1 System
2 Valve
3 Filter material
4, 4' Nozzle
5 Housing body
6 Opening
10 Welding tool
11 Die

The invention claimed is:

1. A method for connecting a filter material to a fluidic component, the method comprising:
    connecting the filter material to the fluidic component, which is a valve having a functional element, which includes a nozzle, by a material bonding process, wherein the filter material is one of: (i) connected to the nozzle; or (ii) connected to a housing part of the valve or to another functional element of the valve; and
    automatically supplying the filter material;
    wherein the filter material is provided as a strip, which is wound up as a coil;
    wherein the filter has a mesh width for filtering out particles,
    wherein the material bonding process includes an ultrasonic welding process, and
    wherein a shape and size of the filter material are created by stamping out a strip, and wherein the stamping is carried out by a welding tool for the ultrasonic welding process.

2. The method of claim 1, wherein the filter material has a particular shape and size.

3. The method of claim 1, wherein the welding tool is a sonotrode.

4. The method of claim 3, wherein the stamping and the ultrasonic welding process are carried out in a single working stroke of the welding tool.

5. The method of claim 1, wherein the filter material is connected to the housing part of the valve, and wherein the connecting of the filter material to the housing part of the fluidic component includes assembling the fluidic component in a superordinate assembly.

6. The method of claim 1, wherein the filter material is connected to another functional element of the valve, wherein the filter material is connected to the functional element of the fluidic component, and wherein the connecting includes an assembly operation, in which the functional element is assembled in the fluidic component.

7. The method of claim 6, wherein the fluidic component is equipped with the filter material, and wherein the functional element is assembled in the fluidic component with the filter material connected to the functional element.

8. The method of claim 7, wherein the functional element is assembled with the filter material connected thereto, and wherein the valve is an inlet valve.

9. The method of claim 8, wherein the nozzle is an incoming-air nozzle.

10. The system of claim 9, wherein the nozzle includes an incoming-air nozzle in an inlet opening in the fluidic component.

11. A system, comprising:
    a fluidic component, which is a valve having a functional element, which is a nozzle; and
    a filter material that is connectable to the nozzle of the valve of the fluidic component; wherein the filter material is connected by a material bond to one of: (i) the nozzle; or (ii) a housing part of the valve or another functional element of the valve of the fluidic component, and
    wherein the filter has a mesh width for filtering out particles,
    wherein the material bond is an ultrasonic weld formed by an ultrasonic welding process, and wherein a shape and size of the filter material is formed as a strip created by stamping, and wherein the stamping is carried out by a welding tool for the ultrasonic welding process.

12. The system of claim 11, wherein the filter material is connected to the another functional element of the fluidic component.

13. A method for connecting a filter material to a fluidic component, the method comprising:
connecting the filter material to the fluidic component, which is a valve having a functional element, which includes a nozzle, by a material bonding process, wherein the filter material is one of: (i) connected to the nozzle; or (ii) connected to a housing part of the valve or to another functional element of the valve;
wherein the filter material is provided as one of: a strip, which is wound up on a coil; or in the form of a plate,
wherein the filter has a mesh width for filtering out particles,
wherein the filter material is connected to a functional element of the fluidic component by material bonding,
wherein the connecting occurs as a step of an assembly operation, in which the functional element is installed in the fluidic component,
wherein the material bonding process is an ultrasonic welding process,
wherein a shape and a size of the filter material are created by a stamping, wherein the stamping is carried out by a welding tool for the ultrasonic welding process, and
wherein the stamping and a welding operation of the ultrasonic welding process are carried out in a single working stroke of the welding tool.

14. The method of claim 13, wherein the filter material is automatically supplied as a strip, and the welding tool then moves to stamp the filter material out of the strip, and then moves further in a direction of the nozzle, and when the stamping tool impacts the stamped-out filter material, an ultrasonic vibration is transferred from the stamping tool via the filter material to the nozzle, as a result of which the filter material and a material of the nozzle are plasticized.

15. A method for connecting a filter material to a fluidic component, the method comprising:
connecting the filter material to the fluidic component by a material bonding process;
wherein the filter material is connected to a functional element of the fluidic component by material bonding,
wherein the connecting occurs as a step of an assembly operation, in which the functional element is installed in the fluidic component,
wherein the fluidic component includes a valve,
wherein the functional element includes a nozzle,
wherein the material bonding process is an ultrasonic welding process,
wherein a shape and a size of the filter material are created by a stamping, wherein the stamping is carried out by a welding tool for the ultrasonic welding process, and
wherein the stamping and a welding operation of the ultrasonic welding process are carried out in a single working stroke of the welding tool, and
wherein the filter material is automatically supplied as a strip, and thereupon, the welding tool moves to stamp the filter material out of the strip, and then moves further in a direction of the nozzle, and when the stamping tool impacts the stamped-out filter material, an ultrasonic vibration is transferred from the stamping tool via the filter material to the nozzle, as a result of which the filter material and a material of the nozzle are plasticized.

16. The method of claim 15, wherein the connecting of the filter material to the fluidic component is a step of an operation of assembling the fluidic component in a superordinate assembly.

* * * * *